(12) United States Patent
Tabata

(10) Patent No.: US 12,192,725 B2
(45) Date of Patent: Jan. 7, 2025

(54) VEHICULAR SPEAKER

(71) Applicant: FOSTER ELECTRIC COMPANY, LIMITED, Tokyo (JP)

(72) Inventor: Takayuki Tabata, Tokyo (JP)

(73) Assignee: FOSTER ELECTRIC COMPANY, LIMITED, Tokyo (JP)

( * ) Notice: Subject to any disclaimer, the term of this patent is extended or adjusted under 35 U.S.C. 154(b) by 176 days.

(21) Appl. No.: 17/795,879

(22) PCT Filed: Jan. 29, 2021

(86) PCT No.: PCT/JP2021/003274
§ 371 (c)(1),
(2) Date: Jul. 28, 2022

(87) PCT Pub. No.: WO2021/153742
PCT Pub. Date: Aug. 5, 2021

(65) Prior Publication Data
US 2023/0061027 A1  Mar. 2, 2023

(30) Foreign Application Priority Data

Jan. 30, 2020 (JP) ................................. 2020-013967

(51) Int. Cl.
*H04R 9/02* (2006.01)
*B60R 11/02* (2006.01)

(52) U.S. Cl.
CPC .......... *H04R 9/025* (2013.01); *B60R 11/0217* (2013.01)

(58) Field of Classification Search
CPC ...... H04R 9/025; H04R 9/06; H04R 2499/11; H04R 7/18; H04R 2400/11; H04R 7/04;
(Continued)

(56) References Cited

U.S. PATENT DOCUMENTS

| 4,514,599 A | 4/1985 | Yanagishima et al. |
| 2009/0034760 A1* | 2/2009 | Minamio ............. H04R 19/005 381/175 |

(Continued)

FOREIGN PATENT DOCUMENTS

| JP | S54139718 | 10/1979 |
| JP | S56060191 | 5/1981 |

(Continued)

OTHER PUBLICATIONS

"International Search Report (Form PCT/ISA/210) of PCT/JP2021/003274", mailed on Mar. 16, 2021, with English translation thereof, pp. 1-6.

(Continued)

*Primary Examiner* — Lun-See Lao
(74) *Attorney, Agent, or Firm* — JCIPRNET

(57) ABSTRACT

Speakers for vehicles which can output sound with identical characteristic regardless of shape and dimension of entire components of interiors and exteriors of the speakers and which can be manufactured by small number of components and processes are provided. A speaker for vehicles of the present disclosure includes a vibration component having a plate shape. A vibration surface is formed on a part of the vibration component. A non-vibration surface is formed on (Continued)

a part of the vibration component. A dividing portion divides the vibration surface and the non-vibration surface. A voice coil is fixed on the vibration surface. A holding component is fixed on the non-vibration surface. A magnetic circuit is fixed on the holding component and corresponds to the voice coil.

18 Claims, 6 Drawing Sheets

(58) Field of Classification Search
 CPC ...... H04R 2400/03; H04R 1/24; H04R 9/046; H04R 9/043; H04R 1/2811; H04R 3/14; H04R 31/006; H04R 1/2803; H04R 2460/13; H04R 9/063; H04R 7/10; H04R 7/20; H04R 1/2834; H04R 2499/15; H04R 3/00; H04R 3/002; H04R 1/025; H04R 1/22; H04R 2499/13; H04R 31/00; H04R 9/045; H04R 9/047; H04R 1/023; H04R 1/1075; H04R 11/02; H04R 2307/025; G10K 11/17823; G10K 11/17833; G10K 11/17853; G10K 2210/121; G10K 9/20; G10K 11/16; G10K 11/1754; G10K 11/17819; G10K 11/17821; G10K 11/1785; G10K 11/17854; G10K 11/17855; G10K 11/17857; G10K 11/17861; G10K 11/17873; G10K 15/02; G10K 2210/104; G10K 2210/109; G10K 2210/3053; G10K 2210/3056; G10K 2210/509; G10K 11/025; H04M 2250/12; H04M 1/0214; H04M 1/6058; H04M 1/725; H04M 19/047; H04M 1/026; H04M 1/0277; H04M 1/04; H04M 3/569; H04N 23/6812; H04N 23/687; H03G 7/02; H03G 9/025
 USPC .......................................... 381/86, 322, 302
 See application file for complete search history.

(56) References Cited

U.S. PATENT DOCUMENTS

| | | | |
|---|---|---|---|
| 2009/0175487 A1 | 7/2009 | Tsuchiya | |
| 2010/0189284 A1* | 7/2010 | Kuze | H04R 9/02 381/400 |
| 2012/0177245 A1* | 7/2012 | Shi | H04R 9/063 381/398 |
| 2015/0003639 A1 | 1/2015 | Cheung | |
| 2015/0016660 A1* | 1/2015 | Matsumura | H04R 9/06 381/415 |
| 2017/0006384 A1* | 1/2017 | Wu | H04R 9/06 |

FOREIGN PATENT DOCUMENTS

| | | |
|---|---|---|
| JP | S57-104396 | 6/1982 |
| JP | S57171368 | 10/1982 |
| JP | S57168381 | 10/1983 |
| JP | S59-009693 | 1/1984 |
| JP | S63254896 | 10/1988 |
| JP | 2005014793 | 1/2005 |
| JP | 2007124005 | 5/2007 |
| JP | 3953454 | 8/2007 |
| JP | 2007221638 | 8/2007 |
| JP | 2009159104 | 7/2009 |

OTHER PUBLICATIONS

"Office Action of China Counterpart Application No. 202180008214.1", issued on Oct. 21, 2024, with English translation thereof, p. 1-p. 17.

* cited by examiner

VEHICULAR SPEAKER

CROSS-REFERENCE TO RELATED APPLICATION

This application is a 371 application of the international PCT application serial no. PCT/JP2021/003274, filed on Jan. 29, 2021, which claims the priority benefits of Japan application no. 2020-013967, filed on Jan. 30, 2020. The entirety of each of the above-mentioned patent applications is hereby incorporated by reference herein and made a part of this specification.

FIELD OF INVENTION

The present disclosure relates to speakers for vehicles, and in particular, relates to speakers for vehicles in which resin molded material used for interiors and exteriors of vehicles is used as vibration material.

BACKGROUND

Conventionally, speaker devices which vibrate cone-shaped diaphragms to reproduce sound are widely used in, for example, cars to reproduce music and voice. For example, the speaker device is embedded and arranged in left and right doors for front seats.

In recent years, to create high-quality sound space in car rooms, a plurality of speakers may be installed in limited space of a car such as doors for back seats, a back door, a dashboard, and a ceiling. Accordingly, the speakers for vehicles require free-positioning and space-saving characteristics. However, the speaker with diaphragms requires a certain installation space, and the size of the speaker itself becomes large to ensure high-quality sound, thus making it difficult to achieve free-positioning and space-saving characteristics.

Therefore, for example, as shown in the Patent Documents 1 to 4, an exciter that vibrates for oneself to vibrate the contacting interior material and produces sound from said interior material. According to such an exciter, sound can be reproduced without using cone-shaped diaphragms, and the free-positioning and space-saving characteristics can be achieved.

PRIOR ART DOCUMENT

Patent Document

Patent Document 1: Japanese Laid-Open Patent Publication JP2005-14793A
Patent Document 2: Japanese Patent JP3953454B
Patent Document 3: Japanese Laid-Open Patent Publication S56-60191A
Patent Document 4: Japanese Laid-Open Utility Model Publication S57-168381U

SUMMARY OF INVENTION

Problems to be Solved by Invention

However, with the conventional technologies as described above, it is difficult to reproduce sound signals by quality equivalent to speakers. For example, when the exciter is attached to interior material covering a pillar that is a window pillar of a car, the sound quality changes due to shapes, dimensions, and thickness of the interior material because the entire interior material vibrates. In particular, although the speakers for vehicles are to be provided to vehicles of various types and sizes, since shapes, dimensions, and thickness of the components differ when types and sizes of vehicles differ, the sound with same characteristics cannot be reproduced even when the same exciter is attached to the same interior material.

Furthermore, in the conventional technology, there are disadvantages that a number of components consisting the exciter, such as frames, magnetic circuits, dampers, voice coils, and double-sided tapes, is large, the structure of the exciter is complicated, and a number of processes to manufacture the exciter is large. In particular, there is a problem that when material intervenes between the exciter and the interior material to fix the two, the vibration efficiency decreases, and as a result, the sound quality deteriorates.

The present disclosure is suggested to address the above-described problems of the prior arts. The objective of the present disclosure is to provide speakers for vehicles which can output sound with identical characteristic regardless of shape and dimension of entire components of interiors and exteriors of the speakers and which can be manufactured by small number of components and processes.

Means to Solve the Problem

A speaker for vehicles according to the present disclosure has the following configurations.
(1) A vibration component having a plate shape;
(2) A vibration surface formed on a part of the vibration component;
(3) A non-vibration surface formed on a part of the vibration component;
(4) A dividing portion that divides the vibration surface and the non-vibration surface;
(5) A voice coil fixed on the vibration surface;
(6) A holding component fixed on the non-vibration surface; and
(7) A magnetic circuit fixed on the holding component and corresponding to the voice coil.

The present disclosure may employ the following configuration.
(1) The non-vibration surface is thicker than the vibration surface;
(2) The holding component and the vibration component are separate components and are fixed to each other by an engaging component;
(3) A positioning component is provided to the holding component and the vibration component;
(4) The dividing portion has a rib shape that surrounds the vibration surface;
(5) The dividing portion has a recess shape that surrounds the vibration surface;
(6) The voice coil includes a coil bobbin, a voice coil mounting portion having a cylindrical shape is provided on the vibration surface, and the voice coil is fixed to the vibration surface while the coil bobbin is mounted in the voice coil mounting portion;
(7) A vibration controller is provided on the vibration surface to control vibration thereof;
(8) The vibration controller is connected to the voice coil mounting portion;
(9) In the vibration controller, height of the voice coil mounting portion is higher than height of the dividing portion;

(10) The vibration controller is formed by a plurality of frame portions having cylindrical shapes or polygonal shapes with various sizes, or a linear rib portion, or combinations thereof.

(11) The linear rib portion connects the voice coil mounting portion and the frame portions.

(12) The voice coil and the vibration surface are fixed via a cap mounted on the voice coil.

Effect of Invention

According to the present disclosure, the speaker for vehicles that can be controlled to obtain the desired sound output characteristics regardless of the shape of the entire plate shape component of the interior and exterior can be achieved by forming the vibration surface and the non-vibration surface in parts of the vibration component having the plate shape. Furthermore, the fixation structure of the magnetic circuit, the voice coil, and the vibration component can be simplified by fixing the holding component of the magnetic circuit to the vibration surface.

EMBODIMENTS

1. First Embodiment

[1-1. Configuration]

Figure 1:
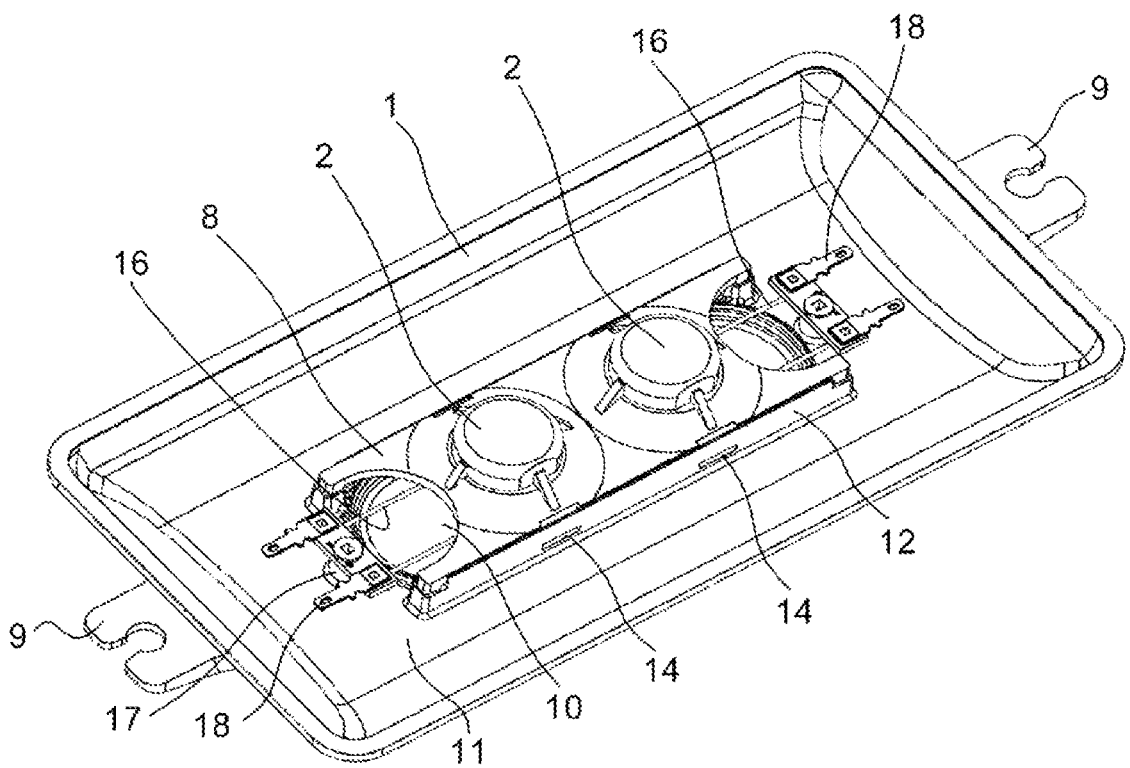
FIG. 1 is an inner perspective view illustrating an entire structure of a first embodiment.
Figure 2:
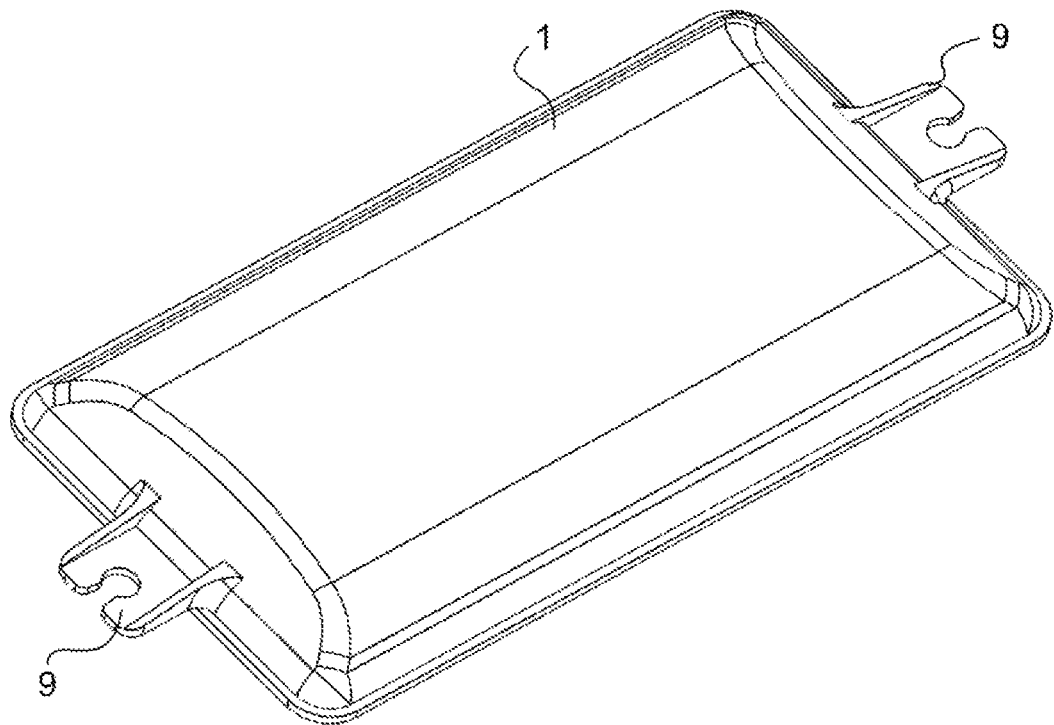
FIG. 2 is an outer perspective view illustrating an entire structure of a first embodiment.
Figure 3:
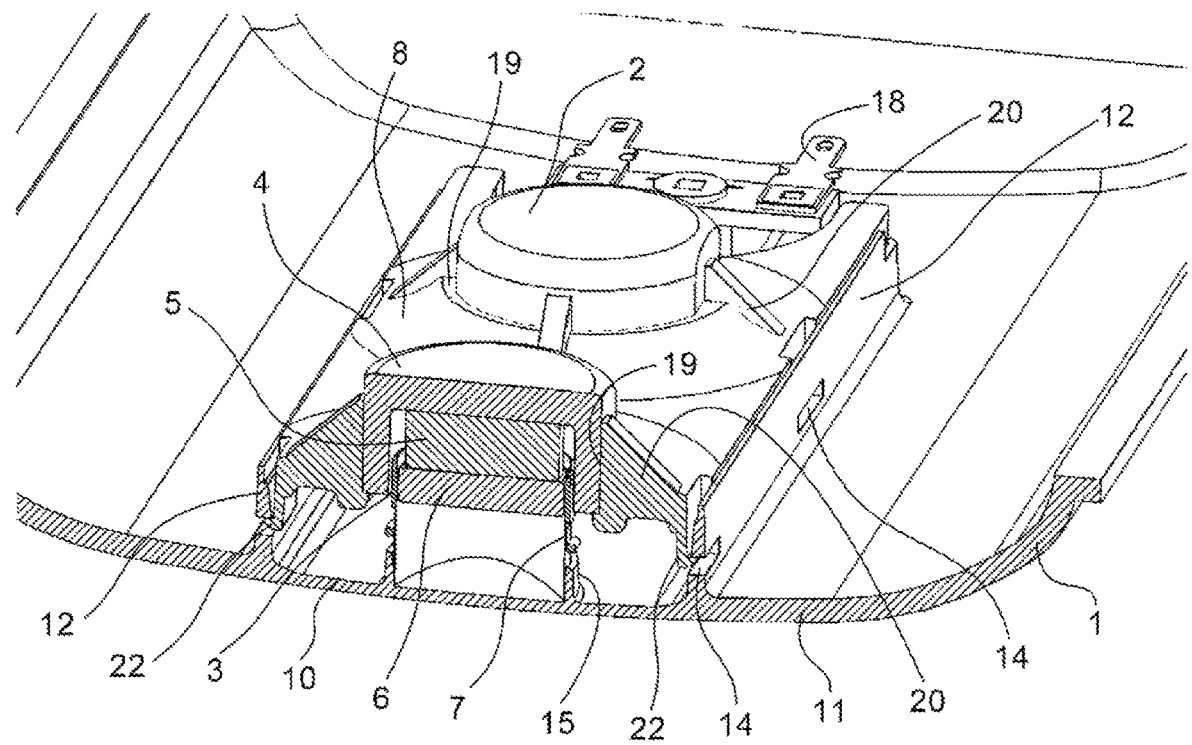
FIG. 3 is an enlarged lateral cross-sectional view illustrating an entire structure of a first embodiment.

As illustrated in FIGS. 1 to 3, a speaker for vehicles of the present embodiment includes a vibration component 1, a magnetic circuit 2, and a voice coil 3. The vibration component 1 is a panel-shaped vibration component forming a part of interior material in vehicles such as pillars, doors, dashboards, instrument panels, console boxes, and ceilings. One example of the vibration component is tray-shaped component in which four sides thereof are curved and stand up. Although the vertical positional relationship of portions of the vibration component 1 changes because it is attached to vehicles in various direction, for convenience, hereinafter, the center portion of the curved panel of the vibration component 1 is described to be at the lower side and the opened portion is described to be at the upper side.

The magnetic circuit 2 corresponds to the voice coil 3, and the numbers of the two are the same. The magnetic circuit 2 may be an inner-magnet-type magnetic circuit or may be an outer-magnet-type magnetic circuit. The magnetic circuit 2 includes a yoke 4, a magnet 5, and a plate 6. The voice coil 3 is wounded around a coil bobbin 7. The coil bobbin 7 is fixed to the vibration component 1. Two voice coils 3 are employed in the first embodiment, however, the number of the voice coil 3 may be one, or three or more. The could bobbin 7 is a cylindrical component, and the voice coil 3 is wounded around the coil bobbin 7.

A holding component 8 is a holding component to hold the magnetic circuit 2 and is generally referred to as a magnetic circuit frame. One example of the holding component 8 is a frame-shaped component. The holding component 8 has the shape and size that can cover a vibration surface 10 (described later) provided to the vibration component 1 from upward.

A protruding portion 9 for fixing the vibration component 1 to the vehicles are provided to the vibration component 1. The vibration component 1 is screwed or clipped to the vehicles by using a notch provided in the protruding portion 9. The shape of the protruding portion 9 is not limited to such a shape, and the number thereof may be increased or reduced if necessary. The outer circumference of the vibration component 1 may adhered to the vehicles by using adhesive without providing the protruding portion 9.

The vibration component 1 includes the vibration surface 10 and a non-vibration surface 11. The vibration surface is a thin portion provided at the center of the vibration component 1 and vibrates when the sound signal is output. The vibration surface 10 of the first embodiment has a long and thin track-shape (two sides in the length direction are linear and both ends are semicircular) along the external shape of the vibration component 1.

The non-vibration surface 11 is a portion thicker than the vibration surface 10 provided in the circumference of the vibration component 1 to surround the vibration surface 10, and does not vibrate even when the sound signal is output. However, since the non-vibration surface 11 is provided in the part of the vibration component 1 together with the vibration surface 10, when the vibration surface 10 vibrates at the time outputting the sound signal, said vibration would be inevitably transmitted to the non-vibration surface 11. In the present disclosure, the non-vibration surface 11 refers to the part where the vibration thereof is smaller than the vibration surface 10 when the sound signal is output while substantially not affecting the output characteristics of the sound signal.

The vibration component 1 has a dividing portion 12 to suppress the vibration transmission from the vibration surface 10 to the non-vibration surface 11 when the sound signal is output. In the first embodiment, the dividing portion 12 is provided in the rib shape that is protruding toward the opening direction of the vibration component 1 than the non-vibration surface 11. Although it is not necessary to provide the dividing portion 12 all around the vibration surface 10, it is preferable to provide the dividing portion 12 all around the vibration surface 10. As illustrated in the cross-section of FIG. 5, in the present embodiment, among the dividing portion 12 provided all around the vibration surface 10 in a track shape, low rib-shaped dividing portion 12 is provided at arc portions that are the two ends of the vibration surface 10 in the lengthwise direction. Furthermore, as illustrated in the cross-section of FIG. 6, the rib-shaped dividing portions 12 protruding up to the height that is several times higher than the thickness of the non-vibration surface 11 are provided two side portions along the lengthwise direction of the vibration surface 10. As illustrated in FIG. 3, since the holding component 8 is fit in the inner side of the tall rib-shaped dividing portion 12 provided at these two sides in the lengthwise direction, to improve the fitting workability, an upper portion of a surface of the dividing portion 12 at the vibration-surface-10 side is an inclined surface expanding toward the non-vibration-surface-11 side.

Figure 4:
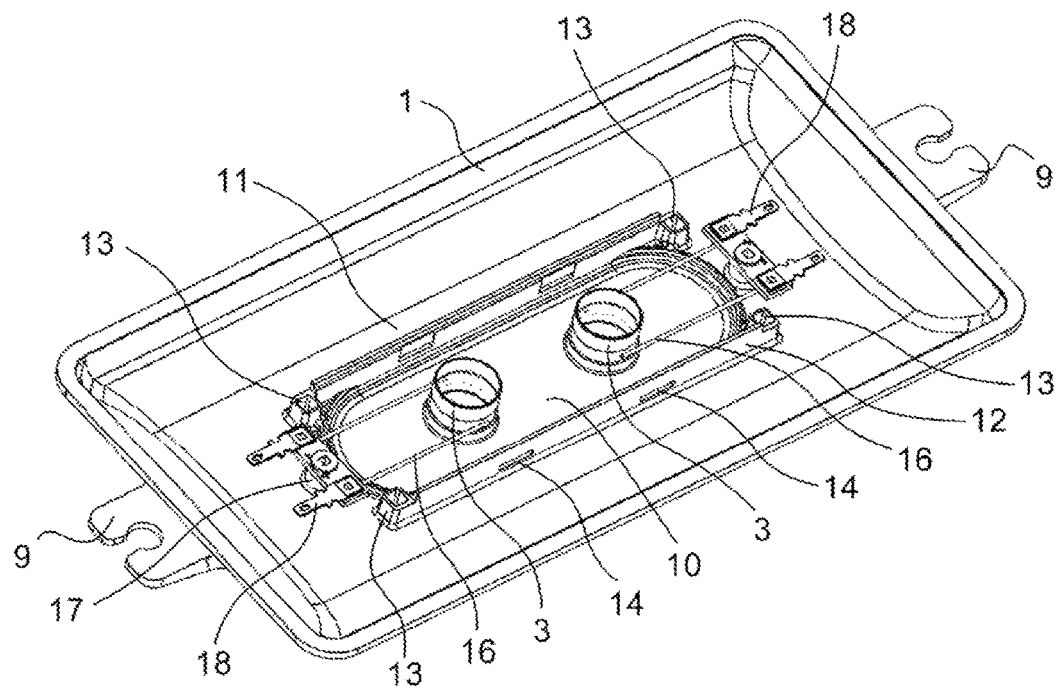
FIG. 4 is an inner perspective view of a panel portion in a first embodiment.
Figure 5:
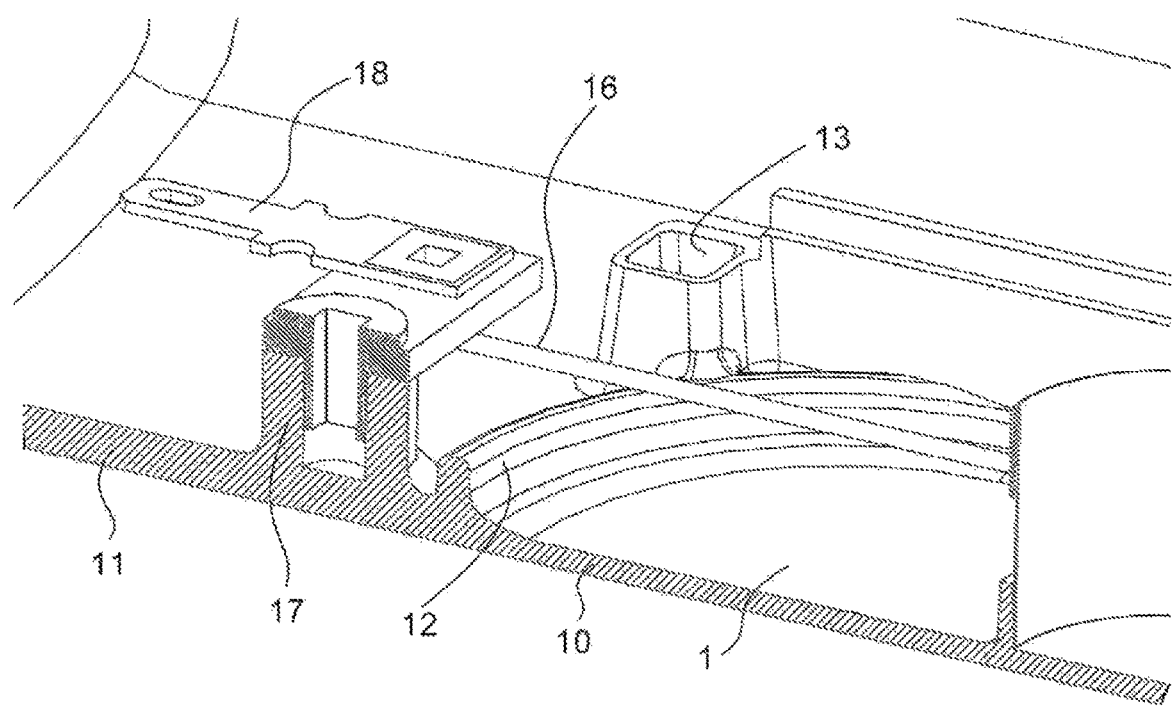
FIG. 5 is an enlarged vertical cross-sectional view of a panel portion in a first embodiment.
Figure 6:
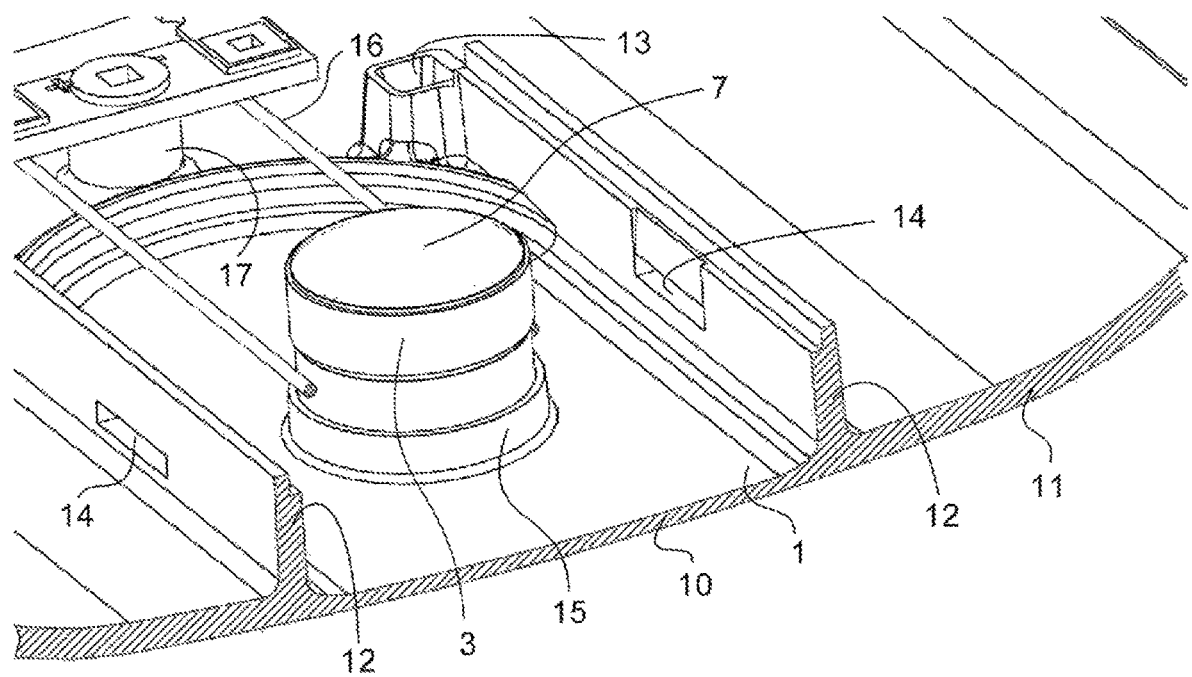
FIG. 6 is an enlarged lateral cross-sectional view of a panel portion in a first embodiment.

As illustrated in FIGS. 4 to 6, a positioning portion 13 is provided to accurately position the holding component 8 to the vibration component 1. The positioning portion 13 is rectangular cylindrical component with an opened top and is provided on the non-vibration surface 11. An inner wall surface of the cylindrical component is an inclined surface expanding upward. The positioning portions 13 are each provided at four corners of the vibration surface 10, that is, the ends of the tall rib-shaped dividing portion 12 at two sides. An engaging hole 14 is provided to fix the holding component 8 to the vibration component 1. The engaging hole 14 is laterally long along the surface of the vibration component 1 and is provided at the base of the tall rib-shaped dividing portion 12. In the present embodiment, since two tall dividing portions 12 are linearly provided to sandwich the vibration surface 10, two engaging holes 14 are provide to each of the dividing portion 12.

As illustrated in FIGS. 3 and 6, the vibration component 1 includes a voice coil mounting portion 15 to mount the voice coil 3 and the coil bobbin 7. The voice coil mounting portion 15 is a cylindrical frame with an opened top so that a lower portion of the coil bobbin 7 of the voice coil 3 can fit thereto. Two voice coil mounting portions 15 corresponding to the number of the voice coils 3 are provided to the vibration surface 10 of the vibration component 1. By fixing the voice bobbin 7 and the voice coil mounting portion 15 using adhesives, the voice coil 3 is integrated with the vibration surface 10 via the coil bobbin 7. A lead wire 16 is drawn out from both ends of the voice coil 3. The lead wire 16 is drawn out toward the arc portion at the end of the track-shaped vibration portion 10 in the lengthwise direction.

As illustrated in FIGS. 5 and 6, a terminal fixing portion 17 is provided to the vibration component 1 to connect the lead wire 16 of the voice coil 3 to external sound equipment. The terminal fixing portion 17 is a cylindrical component protruding upward from the surface of the non-vibration surface 11. The terminal fixing portion 17 is provide close to the arc portion at the end of the track-shaped vibration portion 10 in the lengthwise direction. An upper end of the terminal fixing portion 17 can be horizontally fixed to a connection terminal 18. Press-fitting, adhering, and welding may be appropriately used for the fixing method of the connection terminal 18. In the terminal fixing portion 17, the lead wires 16 of the voice coil 3 are respectively connected to two metal connection terminal 18.

Figure 7:
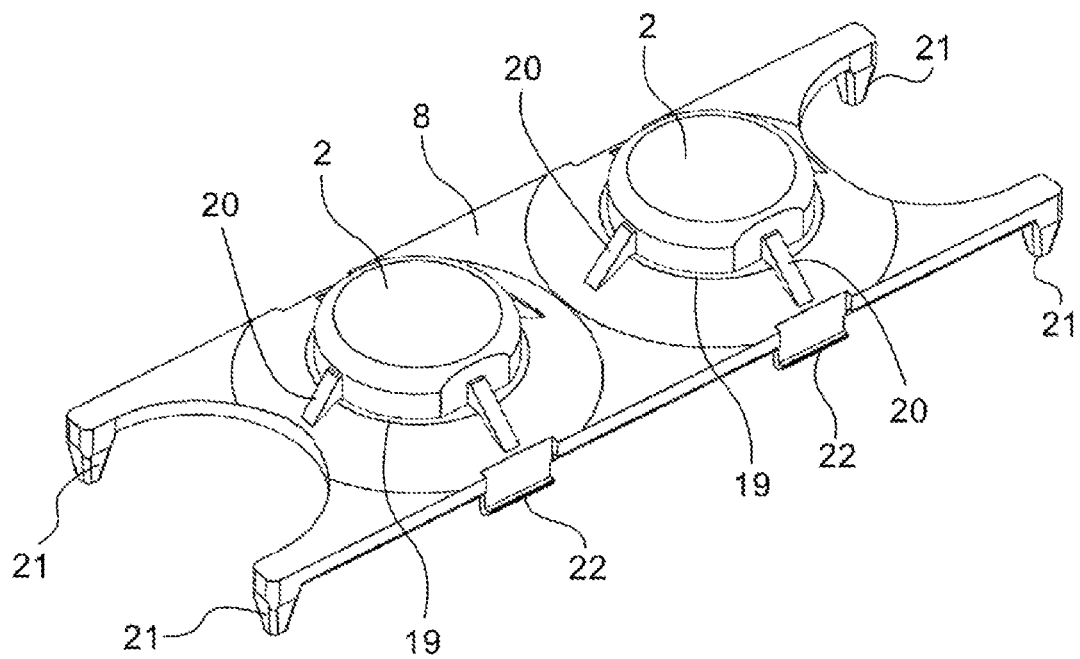
FIG. 7 is an upper perspective view of a magnetic circuit part in a first embodiment.
Figure 8:
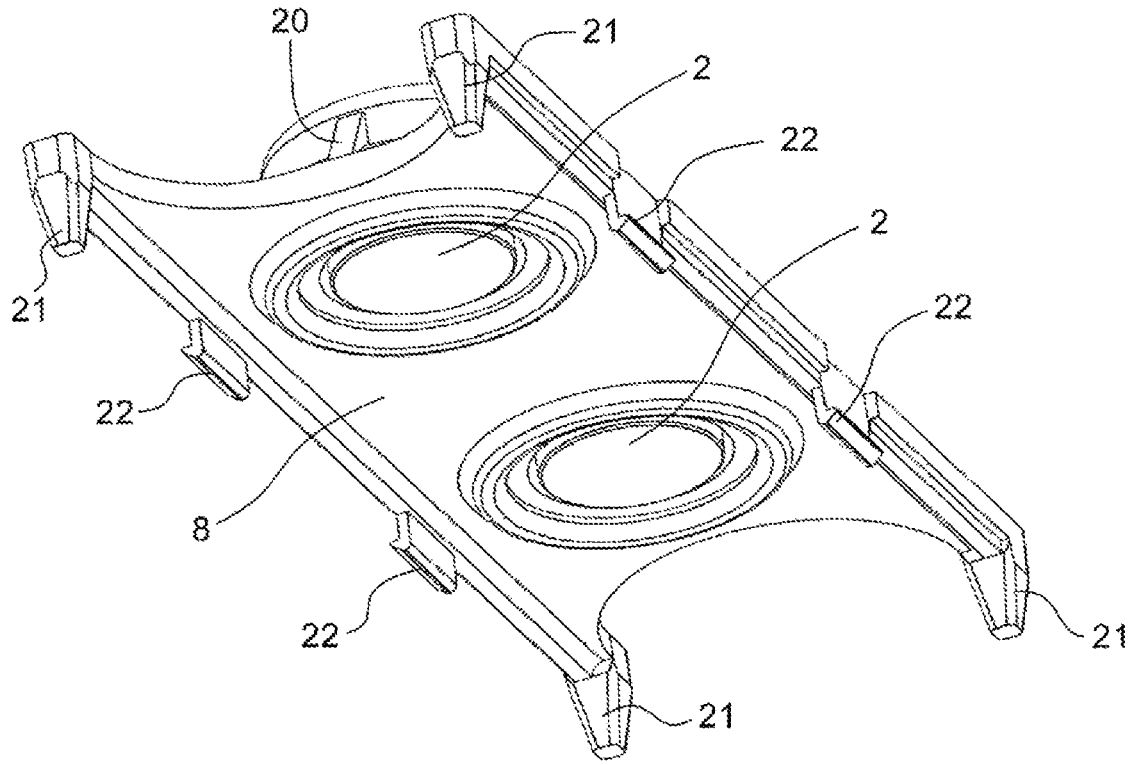
FIG. 8 is a lower perspective view of a magnetic circuit part in a first embodiment.

As illustrated in FIGS. 7 and 8, the holding component 8 includes a magnetic circuit mounting portion 19, a reinforcement rib 20, a leg 21, and an engagement protrusion 22. The magnetic circuit mounting portion 19 is a cylindrical opening portion provided at the center portion of the frame-shaped holding component 8, and the magnetic circuit 2 is fit and fixed therein. Two magnetic circuit mounting portions 19 corresponding to the positions of the voice coils 3 are arranged along the vibration surface 10 in the lengthwise direction.

The reinforcement rib 20 is provided around the magnetic circuit mounting portion 19 to reinforce the magnetic circuit mounting portion 19. The reinforcement rib 20 is triangular and is provided at each four directions between an outer circumferential surface of the cylindrical magnetic circuit mounting portion 19 and an upper surface of the holding component 8. In the present embodiment, the magnetic circuit 2 and the magnetic circuit mounting portion 19 are fixed by insert molding, however, the fixing may be by fit-pressing or adhering, etc.

The legs 21 protruding toward the vibration-component-1-side is provided at four corners of the holding component 8. The leg 21 is commonly called a guide pin, and is provided at a position corresponding to the positioning portion 13 provided in the vibration component 1. That is, the legs 21 and the positioning component 13 are equivalent to "the component for positioning the holding component and the vibration component" of the present disclosure. Although four legs 21 are provided in the present embodiment, the number of legs 21 may be changed depending on the size of the holding component 8. An inclined surface is provided to the leg 21 so that a lower end of the leg 13 gets tapered, making the leg 21 easy to be inserted into the positioning portion 13.

The engagement protrusion 22 is provided to fix the holding component 8 to the vibration component 1. Two engagement protrusions 22 facing the engaging hole 14 of the dividing portion 12 are provided along each of the two sides of the holding component 8 in the lengthwise direction. A lower end of the engagement protrusion 22 protrudes outward and forms a key-shape. The engagement protrusion 22 is deformable in the direction orthogonal to the lengthwise direction of the dividing portion 12 by elasticity of the resin holding component 8. The engagement protrusion 22 and the engaging hole 14 are equivalent to "the component for fixing the holding component and the vibration component" of the present disclosure. The shape of the engagement protrusion 22 is not limited to the above, and the number of the engagement protrusion may be increased or reduced if necessary. The holding component 8 may be adhered and fixed to the leg 21 without providing the engagement protrusion 22.

2. Action of Embodiment

In the present embodiment, the voice coil 3 fixed to the vibration surface 10 is electrically connected to the external device by the lead wire 16. When an electric signal from the external device is transmitted to the voice coil 3 via the lead wire 16, the voice coil 3 vibrates due to interaction between the magnetic circuit 2 and the voice coil 3. Since the voice coil 3 is fixed to the vibration component 1 via the voice coil mounting portion 15, when the voice coil 3 vibrates, the vibration surface 10 of the vibration component 1 vibrates, and the sound is produced.

In the present embodiment, characteristics of the vibration of the voice coil 3 is controlled by the inner vibration surface of the dividing portion 12 provided in the vibration component. That is, the vibration of the voice coil 3 produced by the electric signal from the external device is blocked by the divider 12 and would not be transmitted to the non-vibration surface 11 therearound. Furthermore, by forming the vibration surface 10 to be thinner than the non-vibration surface 11 therearound, the vibration of the voice coil 3 is easily transmitted only on the vibration surface 10. Therefore, not the entire vibration component 1, but only the vibration surface 10 that is in a region controlled by the dividing portion 12 cane be vibrated together with the voice coil 3. As a result, according to the speaker for vehicles, beautiful sound with less distortion that was not achieved only by simply attaching exciters to vibration components such as pillars and doors can be reproduced.

In the present embodiment, the magnetic circuit 2 is fit and fixed inside the magnetic circuit mounting portion 29 and is held by the holding component 8. The holding component 8 to which the magnetic circuit 2 is fixed is accurately positioned to the vibration component 1 by inserting the leg 21 to the positioning portion 13 provided in the vibration component 1. The holding component 8 is easily fixed without using tools and adhesives to the non-vibration surface 11 of the vibration component 1 by fitting the engagement protrusion 22 provided in the holding component 8 to the engaging hole 14 of the vibration component 1.

The voice coil 3 is strongly fixed to the vibration surface 10 by adhering the coil bobbin 7 to the voice coil mounting portion 15. The voice coil mounting portion 15 is the cylindrical frame with the opened top so that the lower portion of the coil bobbin 7 around which the voice coil 3 is wounded can fit thereto, and the voice coil mounting portion 15 can fix the voice coil 3 by the surface thereof. Furthermore, the voice coil mounting portion 15 can prevent the inclining of the coil bobbin 7. Therefore, components such as dampers that have been used in the conventional speaker structure can be removed, making the assembling of the speaker easier. Since the present embodiment employs damperless structure, the reliability of the speaker is improved, and the speaker for vehicles can be used for a long time.

3. Effect of Embodiment (1) In the present embodiment, the speaker for vehicles includes the vibration component 1, the magnetic circuit 2, and the voice coil 3, and by providing the dividing portion 12 that divides the vibration surface 10 and the non-vibration surface 11 to the vibration component, only the vibration surface 10 can be vibrated according to the input signal. As a result, by setting the size of the vibration surface 10 constant, the speaker can output sound with identical characteristic regardless of shape and dimension of the vibration component 1, and same sound output can be expected even when the interiors with various shapes and thickness are installed. Furthermore, if the entire vibration component 1 vibrates like the prior arts, the vibration frequency decreases such that the reproduction of high sound area becomes difficult. However, in the present embodiment, by forming the vibration with small are in part of the vibration component 1, the sound of high sound area can be reproduced.

As described above, in the present embodiment, the speakers for vehicles that can achieve free-positioning and space-saving characteristics, while reproducing beautiful sound with less distortion, thus creating high-quality sound space in vehicles.

(2) By fixing the voice coil 3 in the portion inside the vibration surface 10 and fixing the magnetic circuit 2 to the non-vibration surface 11, only the vibration surface 10 can be vibrated while not vibrating the magnetic circuit 2, and thus, the speaker can reproduce beautiful sound with less distortion.

(3) Since the number of the component intervening between each of the components such as dampers are reduced, the vibration of the voice coil 3 can be directly transmitted to the vibration surface 10. By employing damperless structure, the assembly of the speaker can be facilitated, the reliability of the speaker is improved, and the speaker can be used for a long time in vehicles.

(4) By forming the voice coil mounting portion 15 in a cylindrical shape and increasing the contact area of the coil bobbin 7 and the vibration component 1, the vibration of the voice coil 3 can be directly transmitted to the vibration surface 10, so that the vibration surface 10 can be vibrated according to the input signal.

(5) The coil of the speaker may be a moving-coil type (MC type) and a moving-magnet type (MM type), and in the present embodiment, by employing the moving-coil type (MC type), the lightweight voice coil can be vibrated, and the vibration surface 10 can be vibrated according to the input signal in comparison with the MM type.

(6) By fitting the holding component 8 in the inner side of the tall rib-shaped dividing portion 12 provided at the two sides of the vibration surface 10 in the lengthwise direction, the dividing portion 12 can work as a component to block the transmission of the vibration from the vibration surface 10 to the non-vibration surface 11 and a component to fix the holding component 8 to the non-vibration surface 12, simplifying the entire structure of the speaker.

5. Other Embodiment

The embodiments of the present disclosure are described above, however, those are not intended to limit the scope of the claims. Other various embodiments may be applied without departing from the abstract of the claims, and various omissions, replacements, and modifications may be made thereto, as described below. Furthermore, these embodiments, the combinations and modifications thereof are included in the scope and abstract of the invention and are included in the invention described in the claims and equivalent range thereto. The following is examples included in the present disclosure.

(1) When the dividing portion 12 of the vibration surface 12 has a rib shape, a groove may be provided at the inner lower end of the rib shape. By this, divided vibration of the vibration surface 10 can be prevented, and the vibration surface 10 can be integrally vibrated, reproducing sound with smaller distortion. Although the groove at the inner lower end of the rib shape dividing portion 12 may not be necessarily provided all around the vibration surface 10, it is preferable that the groove is provided all around the vibration surface 10. Furthermore, although the rib shape of the dividing portion 12 may not be necessarily provided all around the vibration surface 10, it is preferable that the dividing portion 12 is provided all around the vibration surface 10.

(2) The dividing portion 12 of the vibration surface 10 may not be necessarily the rib shape and may be a groove. The groove of the dividing portion 12 may not be necessarily provided all around the vibration surface 10, it is preferable that the groove is provided all around the vibration surface 10.

(3) Although the shape of the vibration surface 10 is not limited to a long and thin track-shape (two sides in the length direction are linear and both ends are semicircular) along the external shape of the vibration component, it is preferable that the shape is circular or elliptical. Furthermore, the number of the vibration surface 10 is not limited to one, and a plurality of the vibration surface may be formed in accordance with the number of the voice coil.

(4) A part or all of the contact portion of the holding component 8 and the vibration component 1 may sandwich elastomer film or may be covered by coating. Since gaps between the holding component 8 and the vibration component 1 can be filled by the elastomer film, the vibration of the voice coil 3 is directly transmitted to the vibration surface 10, so that the vibration surface 10 can be vibrated according to the signal, enabling the reproduction of high sound area.

(5) Insert molding or ultrasonic welding may be used as the fixing method for the voice coil 3 and the vibration surface 10, other than adhesion illustrated in the embodiments.

(6) The fixing method for the holding component 8 and the vibration component 1 may be press-fitting or adhesion, or the holding component 8 and the vibration component 1 may be formed in one resin component, other than using an engaging component which is the combined engaging hole 14 and engagement protrusion 22.

Figure 9:
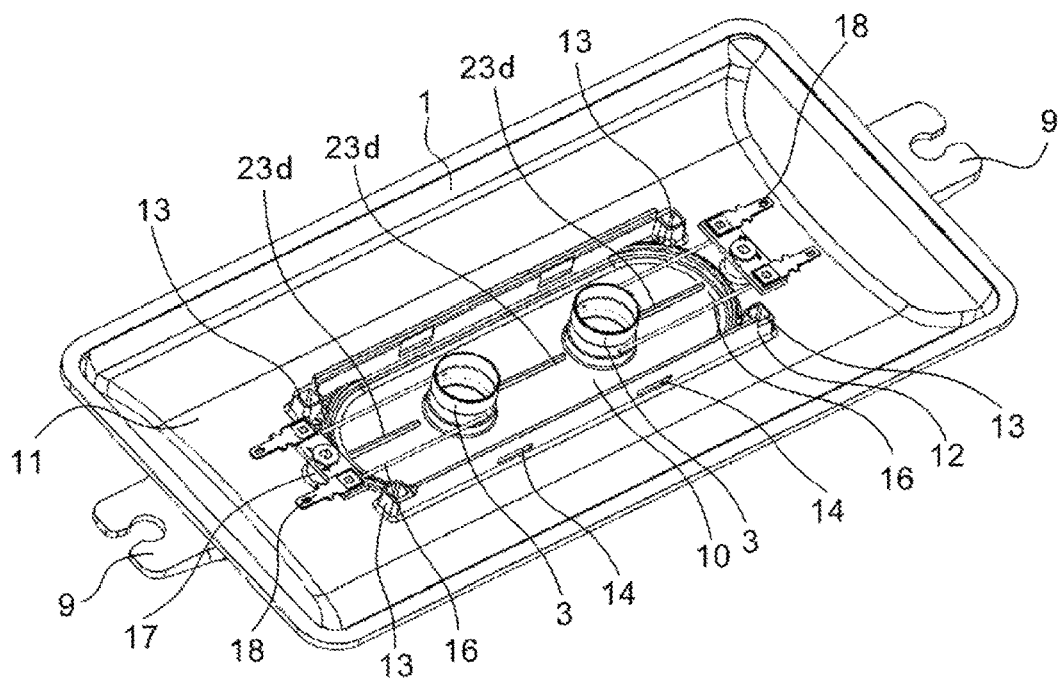
FIG. 9 is a perspective view of a panel portion illustrating a modified example of the first embodiment.

(7) A vibration controller may be formed on the vibration surface 10 to control the vibration thereof. For example, as illustrated in FIG. 9, the vibration controller may be provided by forming one or a plurality of linear rib portion 23*d* at a center of the vibration surface 10 along the length thereof. "Control" by the vibration controller means a control of resonance of the vibration surface 10 due to the vibration of the voice coil 3. By forming the vibration controller, the resonance and separation of the vibration surface 10 can be prevented, and the sound with less distortion can be reproduced.

Figure 10:
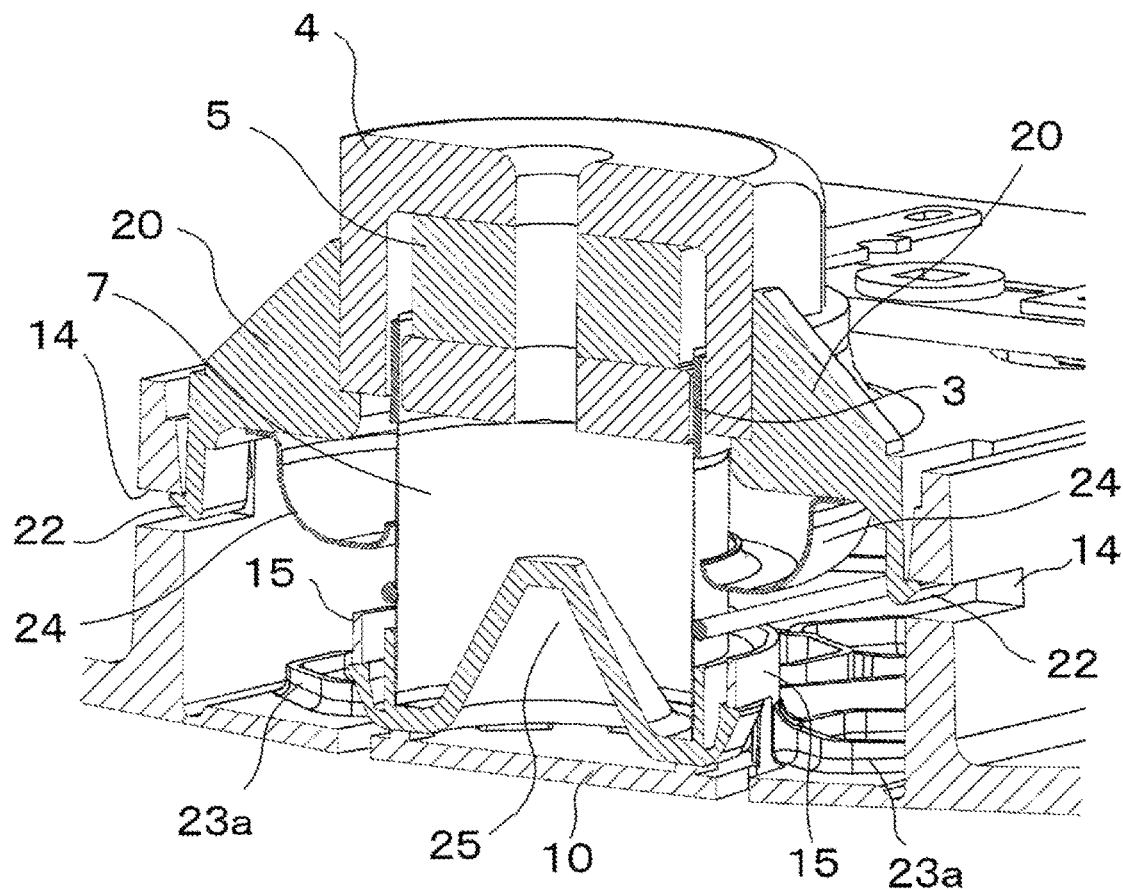
FIG. 10 is an enlarged lateral cross-sectional view illustrating an entire structure of another embodiment.
Figure 11:
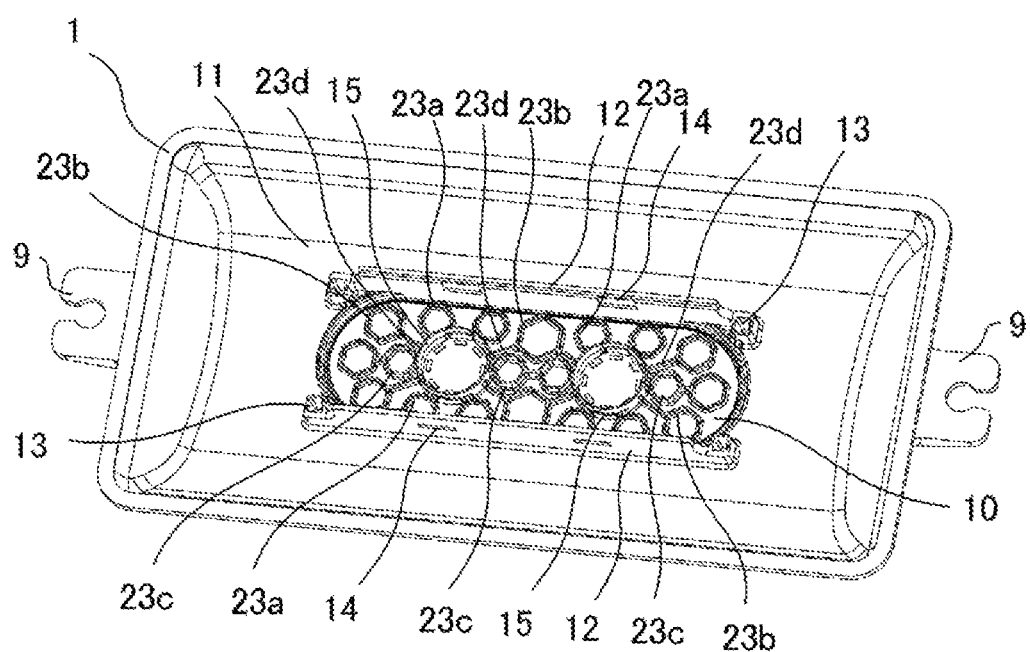
FIG. 11 is a perspective view of a panel portion of another embodiment.

(8) As illustrated in FIGS. 10 and 11, the linear rib portion 23*d* that will be the vibration controller may be connected to the voice coil mounting portion 15. By connecting the linear rib portion 23*d* and the voice coil mounting portion 15, the vibration produced from the voice coil 3 may be efficiently vibrated and transmitted to the vibration surface 10 by the vibration controller.

(9) The vibration controller can be formed by a plurality of frame portions having cylindrical shapes or polygonal shapes with various sizes, or a linear rib portion, or combinations thereof. For example, as illustrated in FIGS. 10 and 11, a hexagonal small frame portion 23*a* may be provided near the voice coil mounting portion 15, and a plurality of hexagonal large frame portion 23*b* may be provided near the dividing portion 12. By changing the shape or size of the vibration controller at the center portion and the peripheral portion of the vibration surface 10 as such, the resonance can be controlled. Furthermore, a tall frame portion 23*c* that is taller than the small frame portion 23*a* is provided at the center line of the vibration surface 10 in the lengthwise direction, so that the rigidity in the lengthwise direction cane be further improved. Note that the tall frame portion 23*c* is taller than the large frame portion 23*b*. In addition, the small frame portion 23*a*, the large frame portion 23*b*, and the tall frame portion 23*c* are connected to the voice coil mounting portion 15 by a linear rib portion 23*d*. By such a configuration, the rigidity of each portion of the vibration surface can be appropriately change from the voice coil mounting portion 15 to the portion near the dividing component 12. By this, the vibration characteristics (resonance performance) of the vibration surface 1 can be adjusted, and the sound space with higher quality can be provided. That is, the resonance dispersion would occur by combining the plurality of cylindrical or polygonal frame portions 23*a*, 23*b*, and 23*c* with various size, and the linear rib portion 23*d*, the frequency characteristic from low sound area to high sound area can be relatively stabilized.

(9) The frame portions such as the small frame portion 23*a*, the large frame portion 23*b*, and the tall frame portion 23*c*, which form the vibration controller, are not limited to the hexagonal shape as long as the frames are each cylindrical or polygonal frame with various size, and the frame portions may be cylindrical or polygonal such as triangular and rectangular.

(10) The vibration controller may not be the combination of the frames 23*a*, 23*b*, and 23*c*, and may be formed by one or a plurality of linear rib portion 23*d*. Furthermore, the shape of the linear rib portion 23*d* may be straight line or curved line, and the formation location of the linear rib portion 23*d* is arbitrary as long as it is on the vibration surface 10. In addition, when the linear rib portion 23*d* is combined the frames 23*a*, 23*b*, and 23*c*, the linear rib portion 23*d* may not be necessarily connected to the voice coil mounting portion 15 while the frames 23*a*, 23*b*, and 23*c* are combined, or the linear rib portion 23*d* may be connected to the voice coil mounting portion 15 while the frames 23*a*, 23*b*, and 23*c* are not combined.

(11) Although the above embodiment does not include the damper to adhere the coil bobbin 7 to the voice coil mounting portion 15, as illustrated in FIG. 10, a damper 24 may be provided to support the coil bobbin 7 (voice coil 3) to the holding component 8. By providing the damper 24, the voice coil 3 can be handled together with the holding component 8, and the voice coil 3 can be fixed to the vibration component 1 while the holding component 8 is fixed to the vibration component 1.

(12) As illustrate in FIG. 10, a cap 25 fixed to a tip of the coil bobbin 7 may be provided. By using the cap 25, the coil bobbin 7 and the vibration surface 10 can be fixed by simple joining work. In this case, it is preferable to provide a portion to abut with the cap 25 at the inner portion of the voice coil mounting portion 15 of the vibration surface 10.

The invention claimed is:

1. A speaker for vehicles comprising:
a vibration component having a plate shape;
a vibration surface formed on a part of the vibration component;
a non-vibration surface formed on a part of the vibration component so as to surround the vibration surface on a same plane of the vibration surface;
a dividing portion having a rib shape formed between the vibration surface and the non-vibration surface so as to surround the vibration surface and that divides the vibration surface and the non-vibration surface;
a voice coil fixed on the vibration surface;
a holding component fixed on the non-vibration surface; and
a magnetic circuit fixed on the holding component and corresponding to the voice coil.

2. The speaker for vehicles according to claim 1, wherein the non-vibration surface is thicker than the vibration surface.

3. The speaker for vehicles according to claim 1, wherein the holding component and the vibration component are separate components and are fixed to each other by an engaging component.

4. The speaker for vehicles according to claim 3, wherein a positioning component is provided to the holding component and the vibration component.

5. The speaker for vehicles according to claim 1, wherein the dividing portion has a rib shape that surrounds the vibration surface.

6. The speaker for vehicles according to claim 1, wherein the dividing portion has a recess shape that surrounds the vibration surface.

7. The speaker for vehicles according to claim 1, wherein:
the voice coil includes a coil bobbin,
a voice coil mounting portion having a cylindrical shape is provided on the vibration surface,
the coil bobbin is mounted on the voice coil mounting portion, and
the voice coil is fixed to the vibration surface via the coil bobbin.

8. The speaker for vehicles according to claim 7, wherein a vibration controller is provided on the vibration surface to control vibration thereof.

9. The speaker for vehicles according to claim 8, wherein the vibration controller is connected to the voice coil mounting portion.

10. The speaker for vehicles according to claim 8, wherein in the vibration controller, height of the voice coil mounting portion is higher than height of the dividing portion.

11. The speaker for vehicles according to claim 8, wherein the vibration controller is formed by a plurality of frame portions having cylindrical shapes or polygonal shapes with various sizes, or a linear rib portion, or combinations thereof.

12. The speaker for vehicles according to claim 11, wherein the linear rib portion connects the voice coil mounting portion and the frame portions.

13. The speaker for vehicles according to claim 1, wherein the voice coil and the vibration surface are fixed via a cap mounted on the voice coil.

14. The speaker for vehicles according to claim 2, wherein the holding component and the vibration component are separate components and are fixed to each other by an engaging component.

15. The speaker for vehicles according to claim 2, wherein the dividing portion has a rib shape that surrounds the vibration surface.

16. The speaker for vehicles according to claim 2, wherein the dividing portion has a recess shape that surrounds the vibration surface.

17. The speaker for vehicles according to claim 2, wherein:
the voice coil includes a coil bobbin,
a voice coil mounting portion having a cylindrical shape is provided on the vibration surface,
the coil bobbin is mounted on the voice coil mounting portion, and
the voice coil is fixed to the vibration surface via the coil bobbin.

18. The speaker for vehicles according to claim 2, wherein the voice coil and the vibration surface are fixed via a cap mounted on the voice coil.

* * * * *